Jan. 24, 1967  J. E. HALVERSON  3,300,054
EGG RACK
Filed April 22, 1965
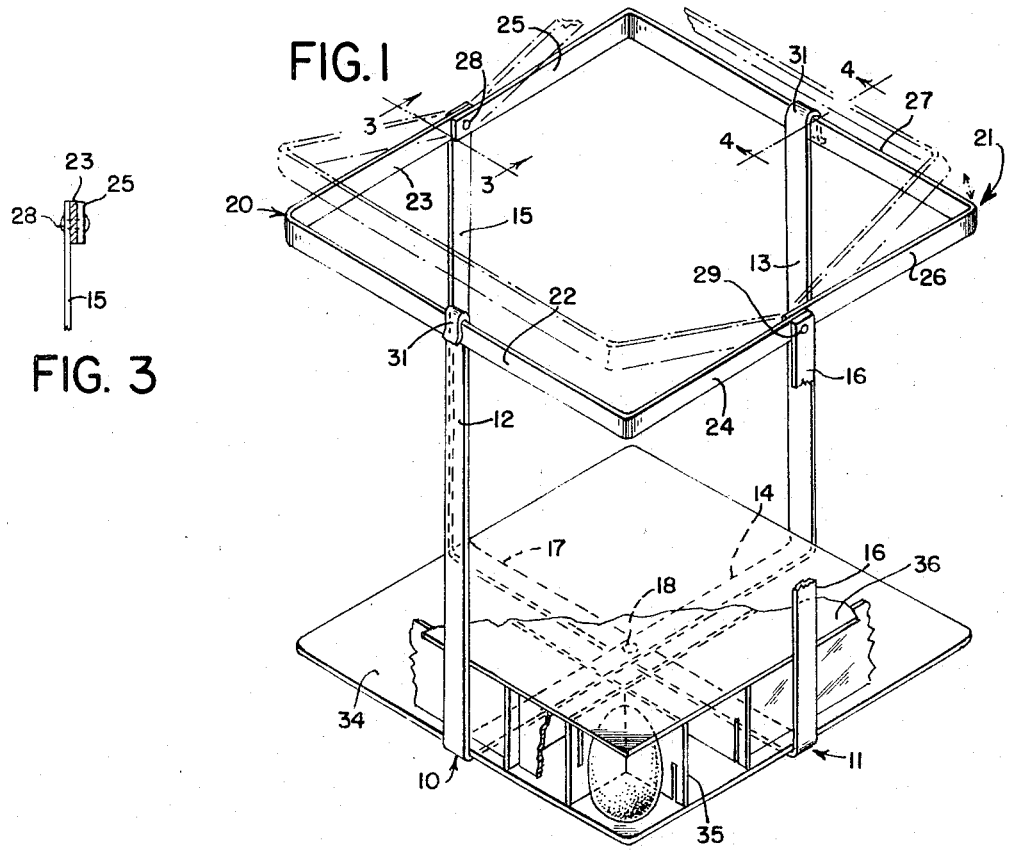
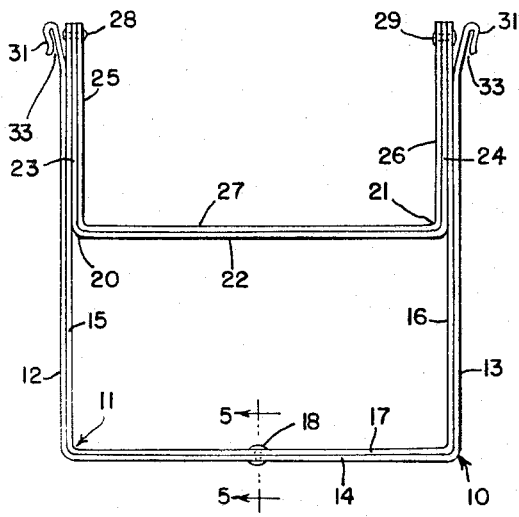
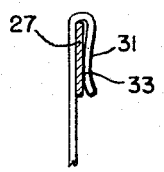
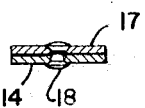
INVENTOR.
JAMES E. HALVERSON
BY
*Caswell Lagaard & Wicks*
ATTORNEYS

United States Patent Office 3,300,054
Patented Jan. 24, 1967

3,300,054
EGG RACK
James E. Halverson, Dallas, Wis. 54733
Filed Apr. 22, 1965, Ser. No. 450,047
4 Claims. (Cl. 211—14)

The herein disclosed invention relates to egg racks and has for an object to provide an egg rack which may be collapsed into extremely compact form or which may be erected into a form to hold twelve dozen eggs.

An object of the invention resides in constructing the rack with two vertical frames U-shaped in form and having spaced uprights with cross bars therebetween.

Another object of the invention resides in pivoting the cross bars of the frames about the centers thereof.

A still further object of the invention resides in constructing one of the frames with a shorter cross bar than the other so that the frames will nest when folded into collapsed position.

An object of the invention resides in providing two U-shaped horizontal frames each having spaced legs with a connecting portion therebetween, said legs being pivoted at their free ends and to the upper free ends of the uprights of one of said vertical frames.

Another object of the invention resides in providing the two uprights of the other vertical frame with latches at their upper ends adapted to engage the connecting portions of the horizontal frames to hold the structure in erected position.

Other objects of the invention reside in the novel combination and arrangement of parts and in the details of construction hereinafter illustrated and/or described.

In the drawings:

FIG. 1 is a perspective view of an egg rack illustrating an embodiment of the invention with the parts in erected position.

FIG. 2 is a plan view of the rack with the parts in collapsed position.

FIG. 3 is a fragmentary sectional view taken on line 3—3 of FIG. 1.

FIG. 4 is a fragmentary sectional view taken on line 4—4 of FIG. 1.

FIG. 5 is a fragmentary sectional view taken on line 5—5 of FIG. 2.

The invention comprises two vertical frames 10 and 11. The frame 10 is provided with spaced uprights 12 and 13 and with a cross bar 14 therebetween. The frame 11 is similarly constructed with uprights 15 and 16 and with a cross bar 17 therebetween. The cross bars 14 and 17 are hingedly connected together by means of a rivet 18 which extends through the centers of the said cross bars. The cross bar 17 is slightly shorter than the cross bar 14 so that the two frames may be swung into nested position as shown in FIG. 2.

Operating in conjunction with the frame 10 and 11 are two horizontal frames 20 and 21. These frames are U-shaped in form similar to the frames 10 and 11. The frame 20 is constructed with two legs 23 and 24 and a connecting portion 22 therebetween. Frame 21 is constructed with two spaced legs 25 and 26 and with a connecting portion 27 therebetween. The connecting portion 27 of frame 21 is shorter than the connecting portion 22 of frame 20 so that when folded in collapsed position the frame 21 nests within the frame 20. The legs 23 and 25 of frames 20 and 21 overlie upright 15 of frame 11 and are pivotally connected thereto by means of a rivet 28 which extends through the free ends of all of said members. Similarly, legs 24 and 26 and upright 16 are connected together by means of a rivet 29. The legs 23, 25, 24 and 26 of frames 20 and 21 are disposed within the confines of the uprights 15 and 16 and connecting portion 22 is shorter than the cross bar 17 of frame 11 whereby the folded frame structure comprising frames 20 and 21 may nest within the folded frame structure comprising frames 10 and 11.

When it is desired to erect the egg rack, the two frames 20 and 21 are folded upwardly to a position shown in dotted lines in FIG. 1 and above the height of the upper ends of the uprights 12 and 13. Frames 10 and 11 are then moved on the pivot 18 until the said frames are at right angles to one another as shown in FIG. 1. The frames 20 and 21 are then moved below the upper ends of the uprights 12 and 13 and then brought upwardly until the same lie opposite ends of said uprights. Turned back upon the upper ends of uprights 12 and 13 are two latches 31 and 32 with spaces 33 therebetween and into which the connecting portions 22 and 27 of frames 20 and 21 may be slid. When the parts are so arranged, the rack is fully erected.

A bottom 34 is placed on the cross bars 14 and 17 and held in position between uprights 12, 13, 15 and 16. Upon this bottom is placed an egg filler 35 and overlying the same a spacer 36. In the particular rack shown, four layers of eggs may be carried making a total of twelve dozen eggs. In the handling of the rack the rack may be lifted by engaging the connecting portions 22 and 27 of frames 20 and 21 or by means of any suitable bale pivoted on the rivets 28 and 29 of the rack and not shown.

The advantages of the invention are manifest. The invention is extremely simple and may be constructed from strap iron or flat wire at an economical cost. When collapsed the rack proper occupies a space no greater than the width of the material from which the frames are constructed. The rack can be handled by using the connecting portions 22 and 27 or by means of a suitable U-shaped bale attached to the same as specified.

Changes in the specific form of the invention, as herein described, may be made within the scope of what is claimed without departing from the spirit of the invention.

Having described the invention, what is claimed as new and desired to be protected by Letters Patent is:

1. An egg rack comprising:
   (a) two U-shaped vertical frames each having
   (b) spaced vertical uprights with
   (c) horizontal cross bars between the lower ends thereof,
   (d) pivot means between the cross bars of said frames guiding said frames for movement from a nested position to an extended position,
   (e) the cross bar of one of said frames being shorter than the cross bar of the other frame to accommodate nesting of the frames,
   (f) two U-shaped horizontal frames having
   (g) spaced horizontal legs with
   (h) connecting portions between corresponding ends of said horizontal legs,
   (i) the connecting portion of one of said horizontal frames being shorter than the connecting portion of the other frame to accommodate nesting of the horizontal frames,
   (j) pivot means between the inner ends of the horizontal legs and the upper ends of the uprights of one of said vertical frames and
   (k) egg supporting means carried by said horizontal cross bars of said vertical frames.

2. An egg rack comprising:
   (a) two U-shaped vertical frames each having
   (b) spaced vertical uprights with
   (c) horizontal cross bars between the lower ends thereof,
   (d) pivot means between the cross bars of said frames guiding said frames for movement from a nested position to extended positions, (e) the cross bar of one of said frames being shorter than the cross bar of the other frame to accommodate nesting of the frames,
(f) two U-shaped horizontal frames having
(g) spaced horizontal legs with
(h) connecting portions between corresponding ends of said horizontal legs,
(i) the connecting portion of one of said horizontal frames being shorter than the connecting portion of the other frame to accommodate nesting of the horizontal frames,
(j) pivot means between the inner free ends of the horizontal legs and the upper free ends of the uprights of one of said vertical frames,
(k) latches on the upper ends of the vertical uprights of said other vertical frame engaging the connecting portions of said horizontal frames.

3. An egg rack comprising:
(a) two U-shaped vertical frames each having
(b) spaced vertical uprights with
(c) horizontal cross bars between the lower ends thereof,
(d) pivot means between the cross bars of said frames guiding said frames for movement from a nested position to an extended position,
(e) the cross bar of one of said frames being shorter than the cross bar of the other frame to accommodate nesting of the frames,
(f) two U-shaped horizontal frames having
(g) spaced horizontal legs with
(h) connecting portions between corresponding ends of said horizontal legs,
(i) the connecting portion of one of said horizontal frames being shorter than the connecting portion of the other horizontal frame to accommodate nesting of the horizontal frames,
(j) pivot means between the inner free ends of the horizontal legs and the upper free ends of the uprights of one of said vertical frames,
(k) latches on the upper ends of the vertical uprights of said other vertical frame, said latches having
(l) downwardly opening vertical slots adapted to receive the connecting portions of said horizontal frame members.

4. An egg rack comprising:
(a) two U-shaped vertical frames each having
(b) spaced vertical uprights with
(c) horizontal cross bars between the lower ends thereof,
(d) pivot means between the cross bars of said frames guiding said frames for movement from a nested position to an extended position,
(e) the cross bar of one of said frames being shorter than the cross bar of the other frame to accommodate nesting of the frames,
(f) two U-shaped horizontal frames having
(g) spaced horizontal legs with
(h) a connecting portion between corresponding ends of said horizontal legs,
(i) the connecting portion of one of said horizontal frames being shorter than the connecting portion of the other frame to accommodate nesting of the horizontal frames,
(j) the longer connecting portion of one horizontal frame being shorter than the shorter cross bar of said vertical frames to cause the nested horizontal frame to nest within the nested vertical frames and
(k) egg supporting means carried by said horizontal cross bars.

References Cited by the Examiner
UNITED STATES PATENTS

| | | | |
|---|---|---|---|
| 366,051 | 7/1887 | Weatherley | 108—1 |
| 1,537,174 | 5/1925 | Liskow | 220—6 |
| 1,542,164 | 6/1925 | Nelson | 248—97 |
| 1,971,642 | 8/1934 | Champlin | 248—97 |
| 2,127,607 | 8/1938 | Levow | 294—67 |

CHANCELLOR E. HARRIS, *Acting Primary Examiner.*
CLAUDE A. LE ROY, *Examiner.*
W. D. LOULAN, *Assistant Examiner.*